(12) United States Patent
Procyshyn et al.

(10) Patent No.: US 10,857,666 B2
(45) Date of Patent: Dec. 8, 2020

(54) METHOD OF MANIPULATING PHARMACEUTICAL PRODUCTS WITH AN ARTICULATED ARM APPARATUS AND SYSTEM

(71) Applicant: VANRX PHARMASYSTEMS INC., Burnaby (CA)

(72) Inventors: Christopher A. Procyshyn, Surrey (CA); Jeroen Immerzeel, Squamish (CA); Steve Sang Joon Park, Toronto (CA); Ross M. Gold, North Vancouver (CA)

(73) Assignee: VANRX PHARMASYSTEMS INC., Burnaby (CA)

( * ) Notice: Subject to any disclaimer, the term of this patent is extended or adjusted under 35 U.S.C. 154(b) by 90 days.

(21) Appl. No.: 16/223,003

(22) Filed: Dec. 17, 2018

(65) Prior Publication Data

US 2019/0381652 A1 Dec. 19, 2019

Related U.S. Application Data

(62) Division of application No. 14/377,696, filed as application No. PCT/IB2013/000801 on Feb. 8, 2013.
(Continued)

(51) Int. Cl.
*B25J 9/00* (2006.01)
*B25J 19/00* (2006.01)
(Continued)

(52) U.S. Cl.
CPC ........... *B25J 9/0009* (2013.01); *B25J 9/0075* (2013.01); *B25J 9/042* (2013.01); *B25J 18/04* (2013.01); *B25J 19/0075* (2013.01); *B25J 21/00* (2013.01)

(58) Field of Classification Search
CPC ................................ B25J 9/042; B25J 9/0009
See application file for complete search history.

(56) References Cited

U.S. PATENT DOCUMENTS

| | | | |
|---|---|---|---|
| 5,695,289 A | 12/1997 | Ouchi et al. | |
| 5,775,169 A | 7/1998 | Solomon et al. | |
| (Continued) | | | |

FOREIGN PATENT DOCUMENTS

| | | |
|---|---|---|
| EP | 2812163 | 12/2014 |
| JP | 11000888 | 1/1991 |
| (Continued) | | |

OTHER PUBLICATIONS

PCT (Patent Cooperation Treaty) International Preliminary Report on Patentability (PCT/IB2013/000807); dated Aug. 12, 2014.
(Continued)

*Primary Examiner* — Gerald McClain
(74) *Attorney, Agent, or Firm* — Kevin R. Erdman; Brannon Sowers & Cracraft PC

(57) ABSTRACT

A hermetically sealed multi-axis articulated arm apparatus for use within a sealable isolator chamber comprises a rotational shaft that passes through an opening in the chamber, a sealing member disposed within the chamber for sealing the shaft to an inner surface of the chamber, a plurality of interconnected hermetically sealed arm segments, operably attached to the linear motion shaft; an end effector operably attached to a terminal arm segment among the plurality of arm segments, and at least one fully enclosed drive system for driving and controlling the shaft and the plurality of arm segments. The linear motion shaft may have a sealing member in the form of a bellows. The materials for the parts of the apparatus exposed to the atmosphere of the chamber are compatible with an aseptic and cleanable
(Continued)

environment and the surfaces of the arm segments are shaped to avoid pooling of contaminants.

19 Claims, 10 Drawing Sheets

Related U.S. Application Data

(60) Provisional application No. 61/596,698, filed on Feb. 8, 2012.

(51) Int. Cl.
*B25J 21/00* (2006.01)
*B25J 9/04* (2006.01)
*B25J 18/04* (2006.01)

(56) References Cited

U.S. PATENT DOCUMENTS

| | | |
|---|---|---|
| 5,794,487 A | 8/1998 | Solomon et al. |
| 6,279,412 B1 | 8/2001 | Beaulieu et al. |
| 2002/0078778 A1 | 6/2002 | Grover et al. |
| 2007/0020082 A1 | 1/2007 | Caveney et al. |
| 2009/0298129 A1* | 12/2009 | Spence ............... B01L 3/5085 435/91.2 |
| 2014/0109712 A1 | 4/2014 | Ono |

FOREIGN PATENT DOCUMENTS

| | | | |
|---|---|---|---|
| JP | 11000888 A | * | 1/1999 |
| JP | 11347982 | | 12/1999 |

OTHER PUBLICATIONS

PDA Journal of Pharmaceutical Science and Technology; Technical Report No. 34—Design and Validation of Isolator Systems for the Manufacturing and Testing of Health Care Products; Sep./Oct. 2001, Supplement TR34, vol. 55, No. 5.

International Standard, ISO 10648-2, First edition Dec. 15, 1994; Containment enclosures—Part 2: Classification according to leak tightness and associated checking methods.

PCT, Written Opinion of the International Searching Authority, International Application PCT/IB2013/000801.

European Search Opinion, Application No. 13777821.3, dated Sep. 8, 2014.

* cited by examiner

METHOD OF MANIPULATING PHARMACEUTICAL PRODUCTS WITH AN ARTICULATED ARM APPARATUS AND SYSTEM

CROSS-REFERENCE TO RELATED APPLICATIONS

This application is a division of U.S. patent application Ser. No. 14/377,696, filed on Aug. 8, 2014; which is a National Stage Application of International PCT Patent Application Serial No. PCT/IB2013/000801, filed on Feb. 8, 2013, which claims priority under 35 U.S.C. § 199(e) to U.S. Provisional Patent Application Ser. No. 61/596,698, filed Feb. 8, 2012, all titled ARTICULATED ARM APPARATUS AND SYSTEM, the disclosures of which are incorporated by reference.

FIELD OF THE INVENTION

This invention relates, in general, to pharmaceutical processing. More specifically, this invention relates to a multi-axis articulated manipulating arm apparatus.

BACKGROUND OF THE INVENTION

It is desirable for various pharmaceutical, biotechnology, and food processes or operations to be performed in a sterile environment. Before this can occur, the process environment generally needs to be prepared with a number of steps, such as cleaning via wipe-down and/or wash-down, and decontamination via liquid, vaporized liquid, gas and/or light-based methods. Generally, the process environment pressure has to be maintained and low particle generation needs to be ensured during the process. In addition, limited human contact is often desirable in the sterile processes to limit contamination of product handling surfaces.

In some cases, aforementioned processes need to be contained for product integrity and/or operator safety. Examples of such processes include processing oxygen sensitive products and cytotoxic products. In such cases, the system needs to be operated in a negative pressure environment to prevent egress of the process air and/or the system may run under an inert gas environment such as nitrogen. In addition to the containment requirement, the system may require particle ingress control to prevent product contamination.

In operational settings such as laboratory or production, aforementioned requirements are often met through employing automation systems. However, automation systems tend to have limited flexibility or can typically meet either only sterile process requirements or only containment process requirements.

Exterior surfaces of apparatuses in use for pharmaceutical, biotechnology, and food processes operations require to be smooth, impervious, free of cracks and crevices, non-toxic corrosion resistant and cleanable. Stainless steel is an example of a material that is widely used for such surfaces. In addition to stainless steel there are various other materials with similar or superior characteristics.

For many years multi-axis articulated manipulating arm apparatus have been almost exclusively constructed using relative lightweight arm segments of machined or casted aluminum alloys. Typically these arm segments are anodized to increase corrosion resistance and surface hardness. In some operational settings it is preferable not to use aluminum or anodized aluminum as construction material. The material is not highly scratch resistant; it can chip on impact or shed on friction. Furthermore it is known not to be inert when exposed to oxidizing agents that are used for cleaning and decontamination processes.

Typically this kind of multi-axis articulated arm apparatus comprises arm segments that have bolted plates that cover openings that provide access to drive mechanisms such as motors, encoders, pulleys and belts. The cover plate results in a hard to clean crevice, as do the bolts and machine screws. The rotary joints and linear motion shafts of these apparatuses typically are not sealed to facilitate cleaning and decontamination. In some cases the apparatuses are required to have complex control systems in place to maintain system integrity.

SUMMARY OF THE INVENTION

In a first aspect, there is presented a hermetically sealed multi-axis articulated arm apparatus for use within a sealable isolator chamber, the apparatus comprising: a shaft having a rotational axis, wherein the shaft passes through an opening in the sealable isolator chamber and is configured to rotate around the axis; a sealing member, including: a mounting surface configured for mounting the sealing member on and hermetically sealing it to an inner surface of the sealable isolator chamber, wherein the mounting surface and the inner surface continuously surround the opening in the sealable isolator chamber, a shaft sealing surface defined by the sealing member, which surrounds and seals the shaft, a plurality of interconnected hermetically sealed arm segments, wherein one of the plurality of arm segments is a terminal arm segment, and one of the plurality of arm segments is a first arm segment operably attached to the linear motion shaft; an end effector attached to the terminal arm segment; and at least one drive system for driving and controlling the shaft and the plurality of arm segments, with the drive system being fully enclosed within the articulated arm apparatus.

The shaft can be a linear motion shaft that is further configured to move axially with respect to the opening along the axis. The sealing member can include a bellows mounted between the mounting surface and the shaft sealing surface, and the shaft sealing surface can be operably connected to the first arm segment. The bellows can be disposed within the isolator chamber. The bellows can be a stainless steel bellows.

The outer surfaces of the linear motion shaft, bellows, and arm segments can be stainless steel. The stainless steel can be electro-polished. The stainless steel can be one of 304, 316 and 316L stainless steel. The bellows can be a PTFE bellows.

At least one of the plurality of arm segments can be joined to another of the plurality of arm segments by a hermetically sealed rotary elbow joint, the rotary elbow joint comprising a rotatable hub, an elbow housing, and a radial seal member for hermetically sealing the hub to the elbow housing. The radial seal member can comprise a circumferentially sealing part that extends axially outwards from the elbow housing along the hub to prevent contamination. The circumferentially sealing part can be an exposed cleanable radial lip seal. The radial seal member can comprise a plurality of circumferentially sealing parts. The plurality of circumferentially sealing parts can include at least three circumferentially sealing parts.

At least one of the arm segments of the hermetically sealed multi-axis articulated arm apparatus can comprise a stainless steel outer shell that increases a strength to mass ratio of the at least one arm segment sufficiently to cause the ratio to be closer to a strength to mass ratio of an aluminum arm of equivalent dimensions that is machined from a solid piece than to a strength to mass ratio of a stainless steel arm of equivalent dimensions that is machined from a solid piece. The terminal arm segment is the one of the at least one arm segments that comprises the stainless steel outer shell that increases the yield strength.

An upper surface of at least one of the plurality of arm segments can be configured to inhibit pooling of a liquid on the articulated arm apparatus and to facilitate runoff of the liquid from the articulated arm apparatus. The upper surface can have a profile to direct contaminants off the upper surface. The profile can comprise at least one section with a slope of at least one degree with respect to the horizontal. A plurality of edges of at least one arm segment can be radiused to facilitate removal of liquids. The end effector can be configured to dispense a pharmaceutical product. The end effector can be configured to support a tray. The end effector can be configured to manipulate a container closure. The arm segment operably attached to the linear motion shaft can be shorter than at least one other of the plurality of arm segments. At least one of the plurality of arm segments can be of seamless single shell design. All of the plurality of arm segments can be of seamless single shell design.

The sealed multi-axis articulated arm apparatus can be an automatically controlled and reprogrammable articulated arm. The drive system can be further operative to drive the end effector.

In a further aspect, there is presented a method of manipulating pharmaceutical products in a sealable isolator chamber, comprising: rotating a shaft that passes through an opening in the sealable isolator chamber, moving a plurality of interconnected arm segments that are operatively connected to the shaft to manipulate the pharmaceutical products, sealing a space within the interconnected arm segments, and sealing a portion of the shaft inside the chamber. The method can further include the steps of translating the shaft in a series of opposing strokes while the step of sealing a portion of the shaft maintains a hermetic seal during the steps of translating. The step of sealing a portion of the shaft can be performed by an element that expands and contracts during the steps of translating. The step of sealing a space within the interconnected arm segments can seal a drive mechanism for moving the arm segments inside the arm segments.

BRIEF DESCRIPTION OF THE DRAWINGS

The drawings illustrate generally, by way of example, but not by way of limitation, various embodiments discussed in the present document.

DETAILED DESCRIPTION OF AN ILLUSTRATIVE EMBODIMENT

An example of an articulated arm apparatus is presented for use in a sealable isolator chamber, the apparatus being compatible with various decontamination methods. It meets a particle generation requirement and can be used in sterile and containment systems such as those encountered in pharmaceuticals processing and handling environments. The apparatus has at least two arm segments capable of multi-axis operation, and has surfaces that are free from imperfections such as pits, folds and crevices. It avoids having top surfaces that are flat and instead provides profiled top surfaces, particularly sloped top surfaces. Part-to-part connections are hermetically sealed and the sealing elements are flush with the parts surfaces. The apparatus is composed of components having a single shell construction. The term "single shell" is used here to describe an enclosing mechanical object formed of a single contiguous piece of material and within which other operative parts made from other materials may be contained. There are no exposed parts with sharp radii, and standard machine screws and bolts are avoided. The apparatus is leak tight as regards air, process fluids, and cleaning fluids. Parts and sub-assemblies are free of slots or gaps of width less than about 10 mm, which could otherwise restrict access for hydrogen inspection, cleaning fluids and decontamination agents. Any shafts moving in and out of the containment space of the isolator do not do so to a contaminated space. All drive mechanisms are fully enclosed.

Figure 1:
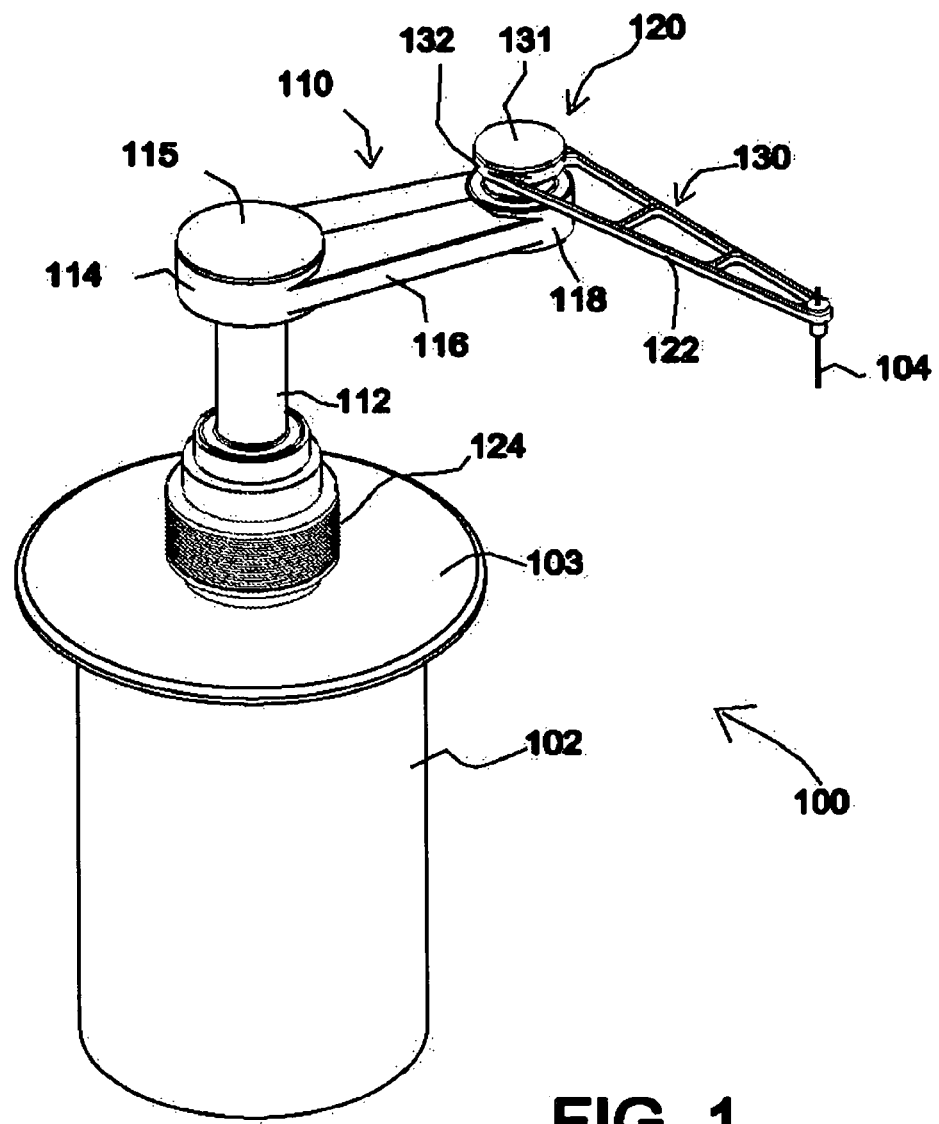
FIG. 1 is a perspective view of an articulated arm.

In FIG. 1 there is provided a multi-axis articulated manipulating arm apparatus 100 that is compatible with various decontamination methods, meets a particle generation requirement, and can be used in sterile and containment systems. Articulated arm apparatus 100 comprises a base 102 configured to be attached within a work area or environment, including but not limited to a production area, an isolator chamber, a process line, or the like. One or more motors or actuators (not shown) can be included in the base 102 to power and control various motions of the articulated arm apparatus 100, as described in more detail below. The base 102 can further comprise a flange 103 that allows the base 102 to be omni-directionally mounted flush with the floor, wall or ceiling of the work area or environment. The flange 103 can include a seal member around a circumference of the flange 103. This arrangement allows the base 102 and its motor(s) to be located outside the work area or environment. In other embodiments, the floor, wall or ceiling of the environment can comprise a seal for sealing with the flange 103.

Apparatus 100 further comprises a shoulder shaft 112 attached to the motor inside the base 102. Shoulder shaft 112 can be a rotatable linear motion shaft configured to rotate around its own axis with respect to the base 102 and to move axially along its own axis with respect to the base 102.

The shoulder shaft 112 can include a bellows 124 to extend and contract with the shoulder shaft 112 to limit, if not eliminate, contamination of the environment within which the articulated arm apparatus 100 and/or 200 is located. The bellows 124 can be configured to cover the portion of the shoulder shaft 112 that extends from the base 102 in a raised or extended position of the shoulder shaft 112, thereby serving to aid in containment of any contaminants from within the base 102, particularly in those situations in which shoulder shaft 112 is axially extended.

The bellows 124 is a sealable flexible container with a structurally contiguous and compressible wall. The wall is configured to compress and extend the container along at least one direction while maintaining the contiguity of the wall and the integrity of the seal. The wall of the container can include, but is not limited to, a compressible concertina or accordion structure having one or more segments. The segments can be, but are not limited to being, curved, folded and/or elastic. The container is typically, but not necessarily, cylindrically symmetrical around an axis of compression and extension of the container. The wall of the bellows can be made of any suitable material such as a metal (e.g, 304, 316, or 316L stainless steel) or a polymeric material (e.g, PTFE).

The articulated arm 100 can include a first arm segment 110 extending from the shoulder shaft 112. The first arm segment 110 can include a shoulder housing 114 and an elbow housing 118, with a first arm segment housing 116 coupled therebetween, as will be described in more detail below. The shoulder and elbow housings 114 and 118 can be rigidly coupled to the first arm segment housing 116. The shoulder housing 114 can be coupled to the shoulder shaft 112 to rotate with the shoulder shaft 112.

The elbow housing 118 can be included in an elbow joint 120 configured to allow movement of a second arm segment 130 of the articulated arm 100 with respect to the first arm segment 110. The elbow joint 120 will be described in more detail below. The second arm segment 130 can include a frame 122 coupled to an elbow housing 132. The elbow housing 132 can be included in the elbow joint 120. The frame 122 can be rigidly coupled to the elbow housing 132 to rotate with the elbow housing 132. An end effector 104 can be coupled to the frame 122. More particularly, the end effector 104 can be coupled to an end of the frame 122. The frame 122 can include an open frame construction to increase strength while decreasing the inertia of the frame 122 and/or promoting better laminar airflow around the frame 122. In another embodiment frame 122 can be formed as a wire frame. In general, the inertia of the frame 122 can be decreased, to allow greater acceleration and/or deceleration of the elbow joint 120. This reduces the load on any motors or actuator employed to operate second arm segment 130.

By virtue of the specific configurations of the various seals described above and by virtue of the sealed single shell construction of the various arm segments of the articulated arm apparatus 100 and 200 the apparatus hermetically seals the isolator chamber within which it is disposed.

The end effector 104 can be configured to perform one or more operations of the process for which the articulated arm 100 is used. In the embodiment shown in FIG. 1, the end effector 104 includes a fill needle 104 used, for instance, to dispense a substance. By way of example, the fill needle 104 can dispense a pharmaceutical substance into a container, such as a vial, jar, or other receptacle. In other examples, the fill needle 104 can be used to dispense other substances into other types of receptacles. The fill needle 104 can include a supply line (not shown) to supply the substance to be dispensed to the fill needle 104. The supply line can be routed either external to the articulated arm 100 or within at least a portion of the articulated arm 100. The end effector 104 can include more than one fill needle to dispense one or more products. The end effector 104 can include other devices in addition to or instead of the fill needle 104, such as one or more of a vacuum cup; a gripper; a sensor, including but not limited to a part presence sensor and/or a level sensor; a tool, including but not limited to a crimper and a screw tool, and/or another device.

Figure 2:
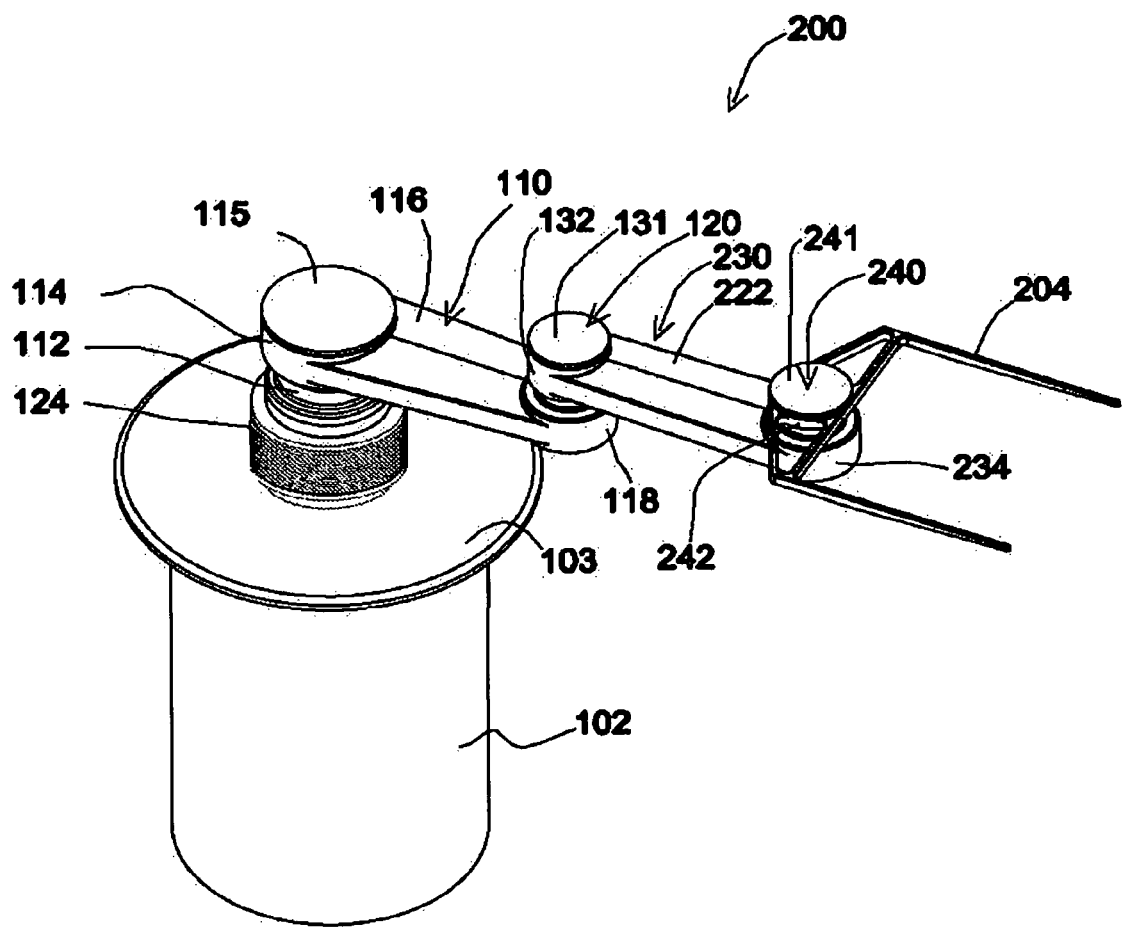
FIG. 2 is a perspective view of another embodiment of an articulated arm.

In FIG. 2 a further embodiment of the apparatus of FIG. 1 is shown as identical in all respects, except as regards the combination of the second arm segment 130 of FIG. 1 and the end effector 104 of FIG. 1, which are replaced by the combination of a second arm segment 230 and an end effector 204. Second arm segment 230 includes a second arm segment housing 222 that is coupled to the elbow housing 132. The second arm segment housing 222 is rigidly coupled to the elbow housing 132 to rotate with the elbow housing 132. The end effector 204 is coupled to the second arm segment housing 222. In an example, the end effector 204 is coupled to an end of the second arm segment housing 222. More particularly, the end effector 204 is rotatably coupled to the second arm segment housing 222 with an end joint 240. End joint 240 can be similar to the elbow joint 120. The end joint 240 includes an end housing 234 coupled to the second arm segment housing 222 and an end effector housing 242 coupled to the end effector 240, and rotatable with respect to the second arm segment housing 222. The end joint 240 is described in more detail below. The end effector 204 can be configured to perform one or more operations of the process for which the articulated arm 200 is used.

By way of example the end effector 204 can include a holder 204 used, for instance, to hold and/or maneuver a tray. The holder 204 can selectively hold and/or maneuver a tray holding one or more containers, such as one or more vials, jars, or other receptacles. The end effector 104 can include other devices in addition to or instead of the holder 204, such as one or more of a vacuum cup; a gripper; a sensor, including but not limited to a part presence sensor and/or a level sensor; a tool, including but not limited to a crimper and a screw tool, and/or another device.

Arm segments 130 and 230, being part of embodiments shown in respectively FIG. 1 and FIG. 2, can be described by the term "terminal arm segment", as they are the final arm before end effector 104 and 204 respectively in the series of arm segments shown in the two respective embodiments.

Figure 3:
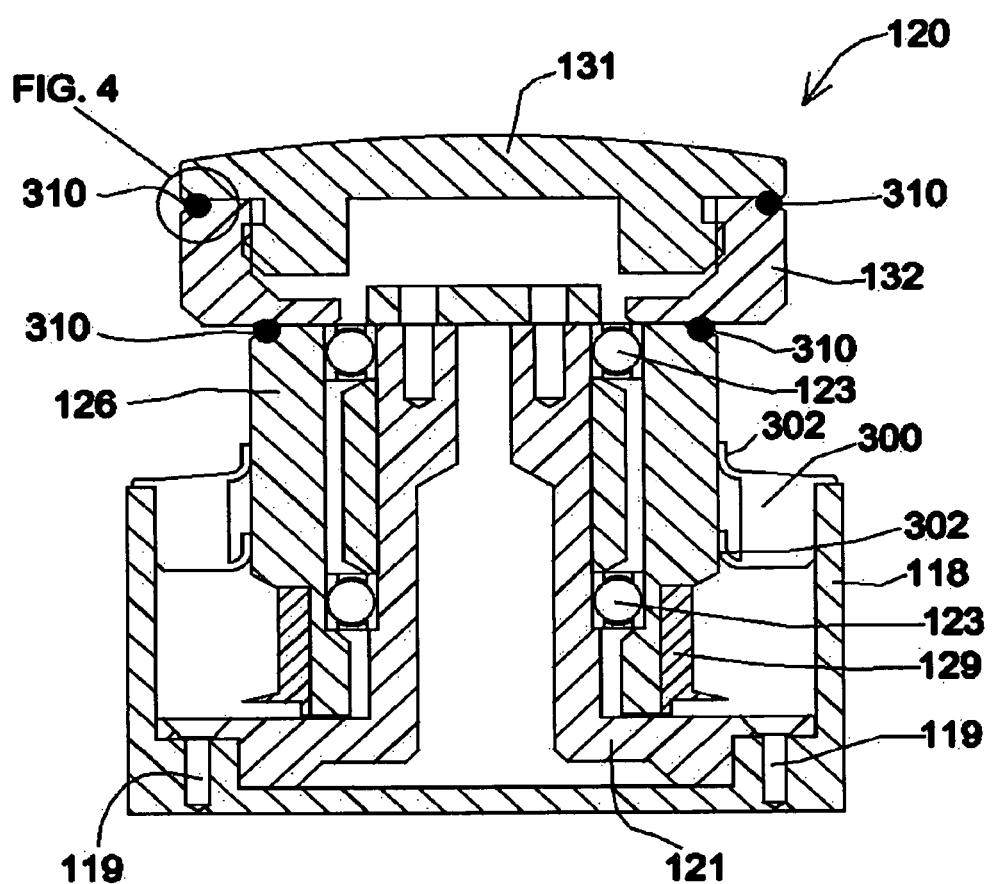
FIG. 3 is a cross-sectional view of a rotating joint of an articulated arm.

FIG. 3 shows an example embodiment of the elbow joint 120 of FIG. 1 and FIG. 2. The same description can also hold for other joints, including but not limited to end joint 240 in FIG. 2. Elbow joint 120 includes the elbow housing 118 of the first arm segment 110. A spindle 121 is coupled rigidly to the elbow housing 118 in order to prevent relative motion between the spindle 121 and the elbow housing 118. The spindle 121 is coupled to the elbow housing 118 with fasteners 119 disposed within an interior of the elbow housing 118 to avoid having external fasteners, which could collect and/or be the source of contaminants and could collect solvents or other cleansers during cleaning of the articulated arms 100 or 200. The spindle 121 can be hollow to allow for a feed through for components, such as, for instance, one or more electrical wires, pneumatic tubing, vacuum tubing, or the like, or a combination thereof. In this way, wiring, tubing, or the like can be routed from the first arm segment 110 toward the distal end of the articulated arms 100 or 200, for instance via the elbow housing 132 of the second arm segment 130 or 230, to the second arm segment 130 or 230 themselves, and/or to the end effectors 104 or 204.

The elbow joint 120 includes a rotatable hub 126, rotatable with respect to the elbow housing 118. The elbow joint 120 includes bearing members 123 between the spindle 121 and the hub 126 to facilitate rotation of the hub 126. In other embodiments, rotation of the hub 126 can be facilitated in other ways, such as, for instance, using a material with a relatively low coefficient of friction between the hub 126 and the spindle 121 and/or abutting surfaces the hub and the spindle and coating at least one of the surfaces with a material with a relatively low coefficient of friction to facilitate sliding motion between the hub and the spindle.

The elbow joint 120 includes a radial seal member 300 disposed between the elbow housing 118 and the hub 126. By way of example, the radial seal member 300 can be disposed at a top edge of the elbow housing 118. The radial seal member 300 provides a seal between the elbow housing 118 and the rotatable hub 126. The radial seal member 300 can comprise one or more fingers 302 extending radially inward toward and abutting the hub 126, and axially outward along the axis of elbow joint 126 (that is, upward in FIG. 3). In an example embodiment in FIG. 3, the radial seal member 300 comprises two fingers 302, being outer and inner fingers both extending radially inward toward and abutting the hub 126, and axially outward along the axis of hub 126 (that is, upward in FIG. 3), to provide an increased seal between the elbow housing 118 and the rotatable hub 126. The fingers 302 can have a resilient property that maintains the fingers 302 in contact with the hub 126 and, thereby, provide a seal.

In other embodiments the radial seal member 300 can include a single finger, being by default an outer finger, extending extending radially inward toward and abutting the hub 126, and extending axially outward along the axis of hub 126. In yet other embodiments, the radial seal member 300 can include a combination of an outer finger extending radially inward toward and abutting the hub 126, and axially outward along the axis of the hub 126 (that is, upward in FIG. 3) and an inner finger extending radially inward toward and abutting the hub 126, and extending axially inward along the axis of the hub 126 (that is, downward in FIG. 3). In yet further embodiments, the radial seal member 300 can comprise more than two fingers 302.

In still further embodiments, the radial seal member can include a combination of a spring-loaded seal and one or more fingers, at least one of the one or more fingers being an outer finger extending radially inward toward and abutting the hub 126, and axially outward along the axis of the hub 126 (that is, upward in FIG. 3). By having the outer finger 302 as a circumferentially sealing part that extends axially outwards along the hub 126, contaminants and other fluids and particles is prevented from gathering on radial seal member 300 against the hub 126. Outer finger 302, in the various embodiments described herein, can be described by the term "exposed cleanable radial lip seal".

In some embodiments, the radial seal member 300 can include the upper finger 302 and an upper surface that both are pitched, or profiled with a slope, to allow liquids, such as solvents or cleansers, to drain or flow off of the radial seal member 300 rather than pooling up or otherwise collecting on or around the radial seal member 300. By way of example, the radial seal member 300 can include an axially-facing, externally exposed surface having no grooves, holes, crevices, or the like, the surface being profiled to direct liquids circumferentially outwardly away from the hub 126 and off of the radial seal member 300 to limit residue being retained on or around the radial seal member 300. The radial seal member 300 can be disposed at the top edge of the elbow housing 126, where it is relatively easily accessible. This facilitates inspection, cleaning, maintenance, and the like. The radial seal member 300 can be used to inhibit contamination of the environment within which the articulated arms 100 or 200 are located by leakage of lubricants and dust potentially created by drive mechanisms or other internal components of the articulated arms 100 or 200. The radial seal member 300 can be compact, which aids in minimizing the mass/inertia of the components of the articulated arms 100 and 200.

The radial seal member 300 can be frictionally maintained in place between the hub 126 and the elbow housing 118. In other embodiments, the radial seal member 300 can be retained in place using various other methods, including but not limited to a press-fit metal ring bonded to the radial seal member 300, a threaded feature, a spring loaded barb, or the like. The radial seal member 300 can be formed from a dry running material, including but not limited to polytetrafluoroethylene (PTFE) and/or composites thereof.

With reference to FIGS. 1-3 the elbow housing 118 includes a pulley 129 attached to the hub 126. Pulley 129 is configured to rotate with the hub 126 (such that there is no relative rotation between the hub 126 and the pulley 129) and accommodate a belt, strap, band, chain, or the like, which is operably coupled to and driven by a motor disposed within the base 102. By way of example, the motor within the base 102 can drive a drive shaft disposed within the shoulder shaft 112 to drive a pulley coupled to the drive shaft. The drive shaft can be rotatable independently of the shoulder shaft 112 to enable rotation of the hub 126 independently of rotation of the shoulder shaft 112. The pulley can be disposed within the shoulder housing 114. The belt, strap, band, chain, etc. can then be routed around both the pulleys, such that rotation of the pulley within the shoulder housing 114 (driven by the motor within the base 102) drives the belt, strap, band, chain, etc. to, in turn drive the pulley within the elbow housing 118, thereby causing the hub 126 to rotate with respect to the elbow housing 118. The belt, strap, band, chain, etc. can include an elastomeric belt, a toothed timing belt, a metal band, a metal strap, a chain, a cord, a wire, or the like. The elbow housing 118 can include a motor and, in some embodiments suitable encoders, therein to drive the hub 126, rather than including the above-described pulley system.

The end joint 240 can be driven in similar manner to those described with respect to the elbow joint 120. By way of example, a separate drive shaft, independently rotatable with respect to the drive shaft and the shoulder shaft 112 described above, can be driven by another motor within the base 102. Another pulley system, similar to but independent of the above-described pulley system, can be disposed within the first arm segment 110 to drive a shaft within, but independently rotatable from, the hub 126, to drive another pulley system, similar to the above-described pulley system, within the second arm segment 230 to drive the end joint 240 in a manner similar to that described above with respect to the elbow joint 120. The elbow joint 120 can include a motor, and, in some embodiments, suitable sensors and encoders, to drive the end joint 240 using a similar pulley system within the second arm segment 230. The end joint 240 can include a motor configured to drive the end effector 204. Various combinations of the above-described drive systems can be used to drive portions of the articulated arm 100 or 200. Determination of which drive system or combination of drive systems to use with the articulated arm 100 and/or 200 can depend on various factors. These include, but are not limited to, desired inertial characteristics of the articulated arms 100 and 200 and portions thereof, the power needed to drive various portions of the articulated arms 100 and 200, the size of various portions of the articulated arms 100 and 200, and the size of the motors used for actuation of various portions of the articulated arms 100 and 200, etc.

The elbow housing 132 of the second arm segment 130 and 230 can be coupled to the hub 126 to rotate with the hub 126. In this way, rotation of the hub 126 causes rotation of the second arm segment 130 and 230. Static seal members 310 can be used between static joints of the articulated arms 100 and 200, such as, for instance, between the hub 126 and the elbow housing 132 of the second arm segment 130 and 230. The static seal member 310 can be disposed at a static joint between the elbow housing 132 of the second arm segment 130 and a elbow cap 131 of the elbow joint 120. Seal members similar to the static seal members 310 shown in FIG. 3 can be used for other static joints between components of the articulated arms 100 and 200. By way of example, such static seal members can be used between the flange 103 of the base 102 and the floor of the environment within which the articulated arms 100 and 200 is used. Such static seal members can be used in the end joint 240 in a manner similar to that described herein with respect to the elbow joint 120. A static seal member can be used between the shoulder housing 114 and the shoulder shaft 112 and/or between the shoulder housing 114 and a shoulder cap 115. Such static seal members can be used for all such static joints between components of the articulated arms 100 and 200. A more detailed description of the static seal member 310 is included below.

Figure 4:
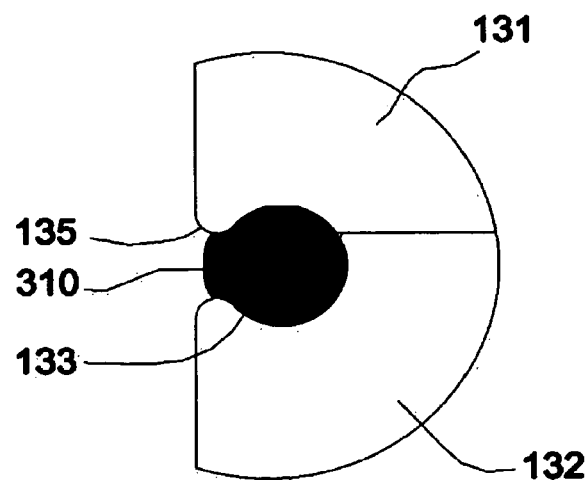
FIG. 4 is an enlarged cross-sectional segmented view of a flush-mounted o-ring seal of the rotating joint of FIG. 3.

With reference to FIGS. 3 and 4 the static seal member 310 includes an o-ring type seal that is placed within an externally accessible channel, such as a channel 133 (as shown in FIG. 4) formed within a portion of the elbow cap 131 and a portion of the elbow housing 132. Although the present description specifically refers to the static seal member 310 between the elbow cap 131 and the elbow housing 132, it should be understood that similar arrangements can be used in the other example locations of the articulated arms 100 and 200 for which such a static seal member 310 can be used, such as the other example locations referred to above. In one embodiment, when the static seal member 310 is captured within the channel 133 and the elbow cap 131 is engaged within the elbow housing 132, a portion of the static seal member 310 extends outwardly from the channel 133 to be disposed at least partially within an opening 135 formed by the elbow cap 131 and the elbow housing 132. The static seal member 310 can form a relatively tight seal between the elbow cap 131 and the elbow housing 132. In other embodiments the static seal member 310 can extend into the opening 135 in a substantially flush manner. That is, the static seal member 310 extends into the opening 135 in a manner that creates little to no crevices, cavities, or other features that would facilitate pooling or collection of contaminants or liquids, such as solvents, cleansers, or the like.

As shown in FIG. 4, exposed surfaces of the elbow cap 131, the elbow housing 132, and the static seal member 310 are pitched to facilitate run off of liquids and lessen the likelihood of pooling and collection of liquids. Also, the exposed surfaces are relatively easily accessible to facilitate inspection and/or cleaning. The static seal member 310 can be used to lessen, if not eliminate, trapping of contaminants, liquids, residue, etc. within static seals, for instance, through capillary forces possible between components. Such capillary forces can be present, for instance, between abutting metal components, and can result in an increased likelihood that liquids, contaminants, residue, etc. can be drawn in between the metal components. By using the static seal member 310 of the above examples, such capillary forces are lessened, if not eliminated, thereby reducing, if not eliminating, such drawing in of liquids, contaminants, residue, etc. between statically engaged components of the articulated arms 100 and 200. The static seal member 310 can be formed from a dry running material, such as, for instance, PTFE and/or composites thereof. In various examples, the static seal member 310 is relatively compact, which aids in minimizing the mass/inertia of the components of the articulated arms 100 and 200.

FIGS. 5-10 show example components of the first arm segment 110. It is noted that similar components can be used in some examples of the second arm segment 230 (FIG. 2), although in some examples, the components of the second arm segment 230 can be sized differently from the components of the first arm segment 110. In other examples, the second arm segment 130 of the articulated arm 100 (FIG. 1) can be replaced with components similar to the components of the first arm segment 110. As such, the description below can be applied to such examples even though the description refers to the first arm segment 110.

Figure 5:
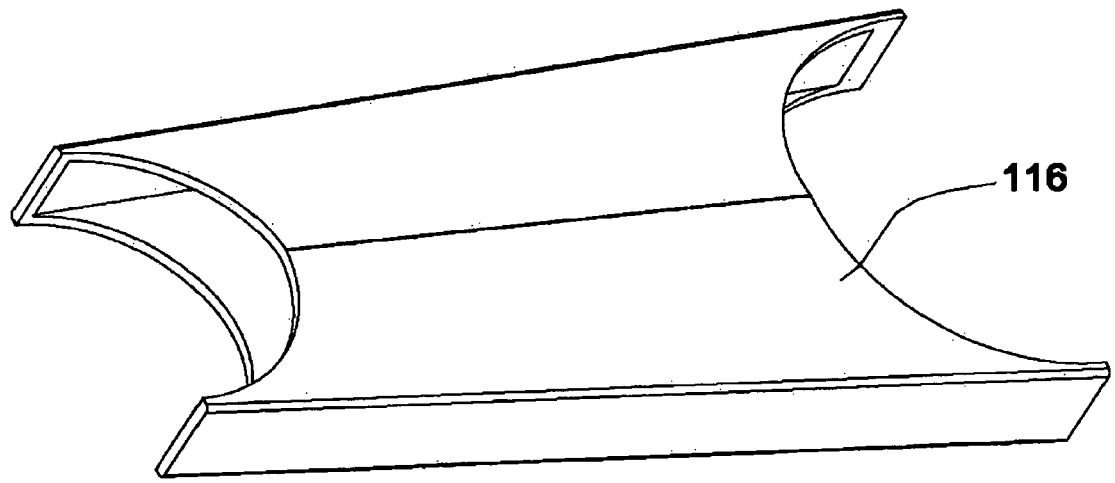
FIG. 5 is a perspective view of a section of an articulated arm.
Figure 6:
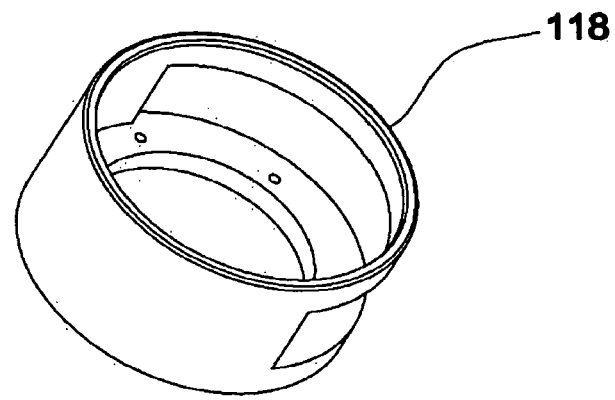
FIG. 6 is a perspective view of a first joint housing of an articulated arm.
Figure 7:
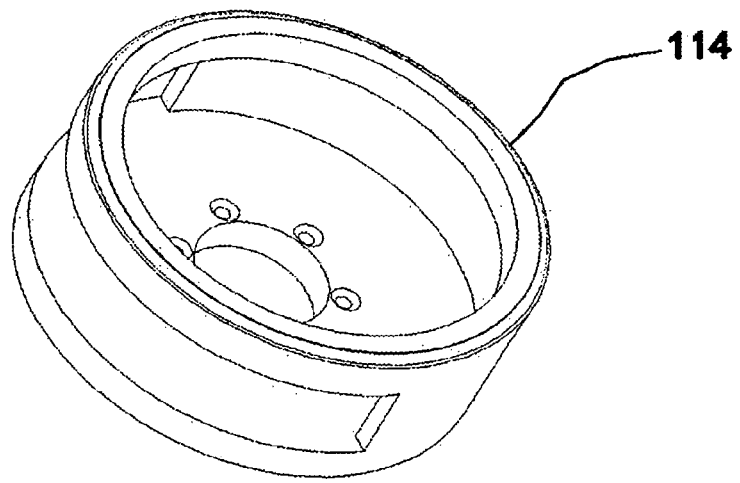
FIG. 7 is a perspective view of a second joint housing of an articulated arm.

Referring now to FIGS. 5-7, the first arm segment 110 includes the first arm segment housing 116, the shoulder housing 114, and the elbow housing 118. The first arm segment housing 116 can include a substantially rectangular tube, welded segments, or formed sheet material with substantially concavely shaped ends to accommodate the substantially cylindrically shaped shoulder and elbow housings 114 and 118. One or both of the shoulder and elbow housings 114 and 118 are machined. The first arm segment housing 116 can include tapered sidewalls to decrease a cross-sectional area of the first arm segment housing 116 from one end of the first arm segment housing 116 to the other end of the first arm segment housing 116. A thickness of the first arm segment housing 116 can be determined by the load carrying capacity of the articulated arm 100 and 200 and material strength calculations. The shoulder and elbow housings 114 and 118 include windows within their sidewalls to accommodate pulley systems, such as those described above. The shoulder and elbow housings 114 and 118 are attached to the first arm segment housing 116. In particular, the shoulder and elbow housings 114 and 118 can be rigidly attached to the first arm segment housing 116. More particularly, the shoulder and elbow housings 114 and 118 can be welded to the first arm segment housing 116.

Figure 8:
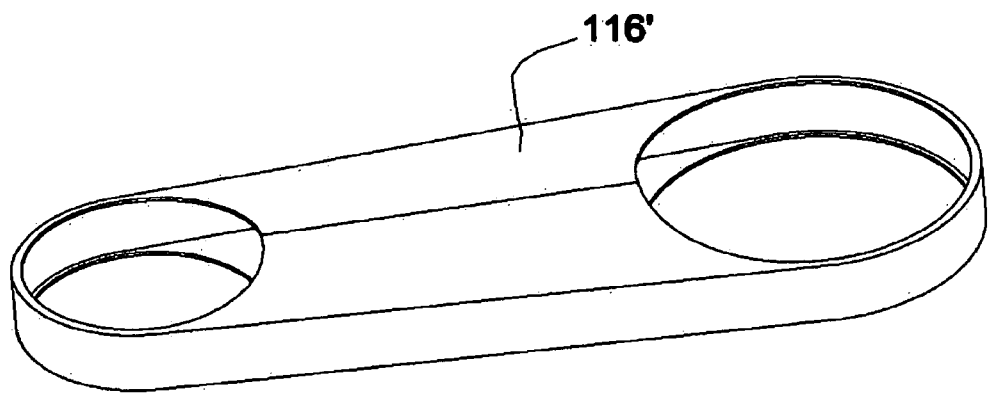
FIG. 8 is a perspective view of a section of an articulated arm.
Figure 9:
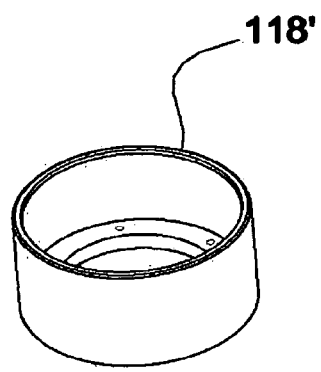
FIG. 9 is a further perspective view of a first joint housing of an articulated arm.
Figure 10:
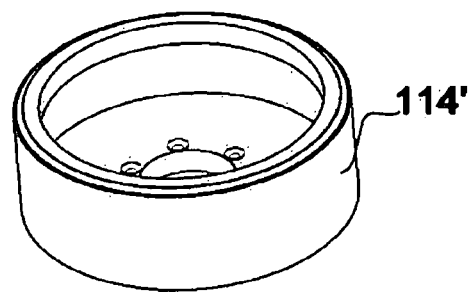
FIG. 10 is a further perspective view of a second joint housing of an articulated arm.

Referring now to FIGS. 8-10, the first arm segment can include a first arm segment housing 116', a shoulder housing 114', and an elbow housing 118'. The first arm segment housing 116' can include a substantially rectangular tube or formed sheet material with closed ends and substantially circularly shaped holes through a top surface and a bottom surface proximate the ends to accommodate the substantially cylindrically shaped shoulder and elbow housings 114' and 118'. One or both of the shoulder and elbow housings 114' and 118' can be machined. The matter of choice of materials and fabrication techniques is discussed in more detail below.

The first arm segment housing 116' can include tapered sidewalls to decrease a cross-sectional area of the first arm segment housing 116' from one end of the first arm segment housing 116' to the other end of the first arm segment housing 116'. A thickness of the first arm segment housing 116' can be determined by the load carrying capacity of the articulated arm and material strength calculations. In some example embodiments, the shoulder and elbow housings 114' and 118' can include windows within their sidewalls to accommodate pulley systems, such as those described above. The shoulder and elbow housings 114' and 118' are attached to the first arm segment housing 116'. In particular, the shoulder and elbow housings 114' and 118' can be rigidly attached to the first arm segment housing 116'. More particularly, the shoulder and elbow housings 114' and 118' can be welded to the first arm segment housing 116'.

Figure 11:
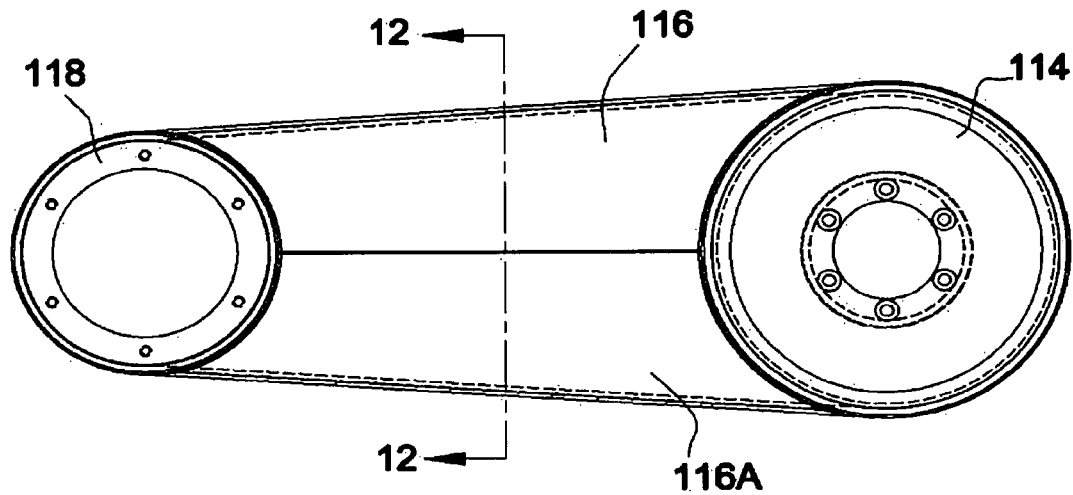
FIG. 11 is a top view of a section of an articulated arm.
Figure 12:
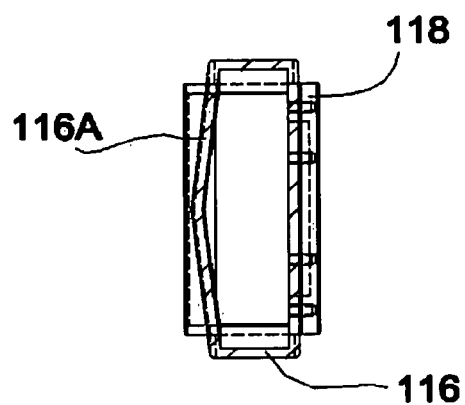
FIG. 12 is a cross-sectional view of a section of an articulated arm, the cross section taken along line 12-12 of FIG. 11.

With reference to FIGS. 11 and 12, the first arm segment housing 116 can include a profiled upper surface 116A to enable contaminants, liquids, or other substances to run off. The upper surface 116A can be profiled to be curved, pitched, sloped or otherwise angled. That is, the upper surface 116A can be configured to inhibit pooling or collection of a material thereon. Other surfaces of the articulated arm apparatus 100 and 200 can be similarly profiled to be curved, pitched, sloped or otherwise angled. Other substantially horizontally-disposed surfaces of the articulated arm apparatus 100 and 200 can be similarly profiled to be curved, pitched, sloped or otherwise angled. For instance, an upper surface of the second arm segment housing 222 (FIG. 2) can be profiled to be curved, pitched, sloped or otherwise angled in a manner similar to that described above with respect to the first arm segment housing 116.

In other embodiments, an upwardly facing surface of the elbow cap 131 (FIG. 3) can be profiled to be curved, pitched, sloped or otherwise angled in a manner similar to that described above with respect to the first arm segment housing 116.

In yet further embodiments, the shoulder cap 115 (FIGS. 1 and 2) and an end cap 241 (FIG. 2) can be profiled to be curved, pitched, sloped or otherwise angled in a manner similar to that described above with respect to the first arm segment housing 116.

In still further embodiments, upwardly facing surfaces of the end effectors 104 and 204 (FIGS. 1 and 2) can be profiled to be curved, pitched, sloped or otherwise angled in a manner similar to that described above with respect to the first arm segment housing 116.

In yet other embodiments, an upwardly facing surface of the flange 103 of the base 102 (FIGS. 1 and 2) can be profiled to be curved, pitched, sloped or otherwise angled in a manner similar to that described above with respect to the first arm segment housing 116.

More generally, the flange 103 and the bellows 124 form a sealing member that provides a sealing surface to directly or indirectly seal against an interior surface of the chamber and a sealing surface that seals the shaft. And while the separate flange built into the body shown in the drawings is presently preferred, the sealing member can also be defined in other ways. The bellows can have an integral flange, for example, which can interface directly with the interior surface of the chamber, thus eliminating the need for a separate flange and body. In one embodiment, a simple seal, such as a spring-loaded seal, can instead act as the sealing member.

In various embodiments, any surface of the articulated arm apparatus 100 and 200 where collection or pooling of a substance could result, can be profiled to be curved, pitched, sloped or otherwise angled in a manner similar to lessen the likelihood of such pooling or collection and facilitate the runoff, draining, or removal of such a substance.

When any of the above profiled surfaces is angled, the angle of the surface is preferably 1 degree or more with respect to the horizontal. The edges of the arm segments can be radiused to facilitate removal of liquids.

External components of articulated arms 100 and 200 can be constructed as a structural skin that provides the required structural strength; alternatively the components can constructed as a single shell having one or a plurality of internal structures that provide part or all of the required structural strength.

External components of the articulated arms 100 and 200 can be formed from one or more rigid materials. In particular, the external components of the articulated arms 100 and 200 (other than at least portions of the radial and static seal members 300 and 310) can be formed from a metallic material or metallic alloy.

In most embodiments the outer surfaces of the linear motion shaft, base, bellows and arm segments are made out of stainless steel. Stainless steel of grade 304, 316 or 316L is the preferred material of construction because it these are the most widely used grades of stainless steel in construction of apparatuses for use in pharmaceutical, biotechnology, and food processes or operations. Stainless steel is usually known to be an acceptable material for the particular process or operation.

The surface finish of construction materials is another major consideration in materials choice. Food equipment standards require ground or polished surfaces to meet a number 4 finish and unpolished surfaces to meet a number 2B mill finish. For pharmaceutical equipment there are no such predetermined standards. The surface finish can vary per process and per product, and has to be determined by cleaning validation studies. For decontamination of equipment by gaseous agents such as hydrogen peroxide, formaldehyde, chlorine dioxide, surfaces with a wide range of surface finish ranging from 2B up to mechanical mirror polish or electropolish are known to work effectively.

Stainless steel has a relative low yield strength to density ratio in comparison to some other materials such as aluminum or titanium. This could be of concern to applications of robotic arm apparatuses that require very low moments of inertia, as may be required to facilitate high acceleration and deceleration rates. If required the strength to density ratio disadvantage can be mitigated by various arm segment fabrication methods outlined below:

Stainless steel single shell arm segments can be fabricated by combining two or more machined parts by welding. Stainless steel machined parts that exceed micro-machining size and cost limitations typically have a minimum wall thickness of approximately ⅛". The weight of the assembly can be significantly reduced by replacing some or all of the surfaces in the assembly by stainless steel materials with wall thickness thinner than ⅛". Examples of suitable thin walled materials are pipe, tubing, sheet metal or shim stock. These materials can be formed by a wide range of methods such as bending, stamping, spinning, deep drawing, rolling, hydroforming and or cutting to the dimensions required to fit the assembly. In addition some or all of the surfaces can be replaced by cast thin walled stainless steel parts.

Welding of thin wall stainless steel assemblies is typically complicated by deformations by warpage due to the heat required to fuse the different parts and due to the heat required to add stainless steel filler material. These deformations can be compensated for by final machining of the assembly after welding; alternatively a low heat welding technique such as laser or electron beam welding can be used.

In view of the above stainless steel arm segment can be fabricated with appropriate wall thickness that meets the strength and fatigue specifications required for a structural single shell for use in an articulated arm apparatus. If the weight and moment of inertia of such arm segment would exceed moment of inertia limitations, the single shell could be changed to a non-structural single shell with one or a plurality of inner structural structures.

Low moments of inertia are beneficial for any articulated arm apparatus, allowing higher acceleration and deceleration; smaller sized motors; smaller sized drive belts; and consequent smaller sized apparatuses to house all the these parts. The reduced size and footprint of the apparatus is also an advantage during cleaning and decontamination.

In some embodiments, the external components of the articulated arms 100 and 200 (other than at least portions of the radial and static seal members 300, 310) can be formed from a material different from stainless, including but not limited to titanium, a titanium alloy and an amorphous metal alloy. In yet other embodiments, the external components of the articulated arms 100 and 200 (other than at least portions of the radial and static seal members 300 and 310) can be formed from a low density metal such as aluminum alloy or composite material which outer surface is fully coated with an impervious, non-flaking, non-chipping, corrosion resistant material such as PTFE, ceramic material or an amorphous metal alloy.

In further embodiments, the external components of the articulated arms 100 and 200 (other than at least portions of the radial and static seal members 300 and 310) can be formed from a combination of two or more materials, including, but not limited to stainless steel, fully coated materials, titanium, amorphous metal alloy, or the like.

In various example embodiments, external components of the articulated arms 100 and 200 can include specific surface characteristics that are conducive of various gas and vapor decontamination methods. In further example embodiments, maintaining minimum arm segments 110 and 130 (or 110 and 230, or 130 and 230) inter-distances can enhance various gas and vapor decontamination processes (in addition to moving arms during decontamination processes) and decrease, if not eliminate, pooling and trapping of cleaning agents, solvents, and other particles. Moreover, adapting frame style arm segment 130 in the articulated arm 100 further enhances various gas, vapor, and light-based decontamination process by decreasing or minimizing shadowing and narrow channels where air circulation dead zones can be created.

Figure 13:
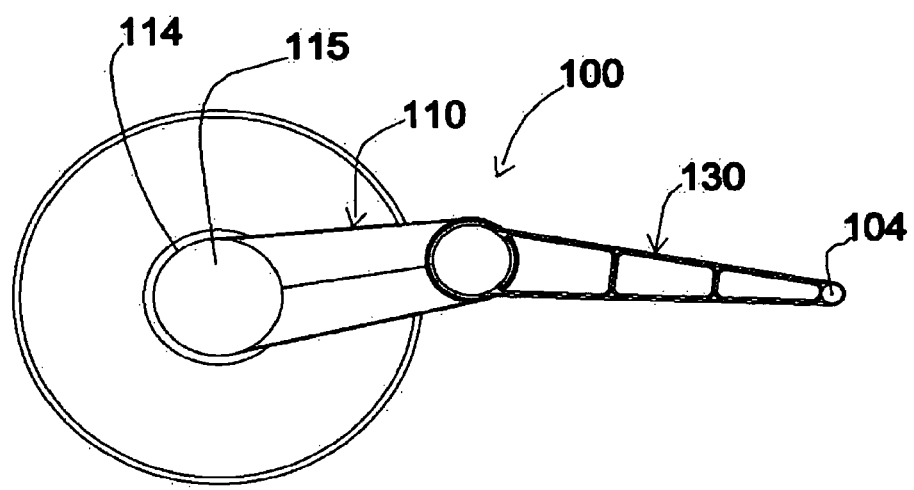
FIG. 13 is a top view of an articulated arm within a high reach travel range.
Figure 14:
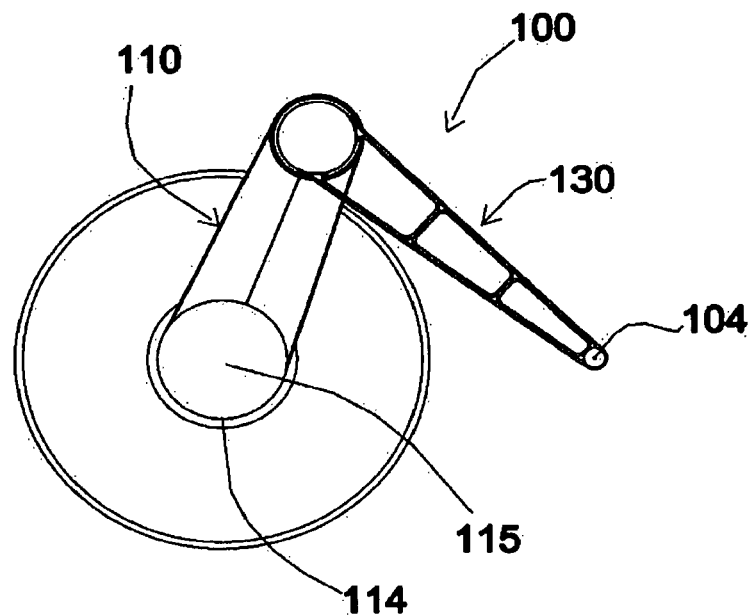
FIG. 14 is a top view of an articulated arm within a medium reach travel range.
Figure 15:
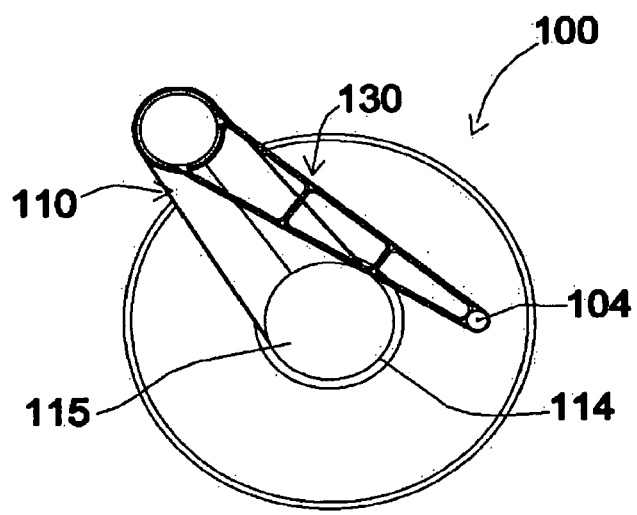
FIG. 15 is a top view of an articulated arm within a low reach travel range.

In FIGS. 13-15 various positions of the articulated arm 100 are shown. FIG. 13 shows an example of the articulated arm 100 within a high reach travel range. FIG. 14 shows an example of the articulated arm 100 within a medium reach travel range. FIG. 15 shows an example of the articulated arm 100 within a low reach travel range. Movement of the articulated arm 100 from the medium reach travel range to the high reach travel range is accomplished primarily with rotation of the elbow joint 120 with only a relatively limited amount of rotation of the shoulder shaft 112. This configuration allows for the articulated arm 100 to relatively quickly transition between the medium and high reach travel ranges. As such, the articulated arm 100 can be desirable for tool trajectories that can be planned such that they require relative small rotations of the shoulder shaft 112 and relative large rotations of the elbow joint 120.

As shown in FIGS. 13-15, the second arm segment 130 includes a different length than that of the first arm segment 110. The second arm segment 130 is longer than the first arm segment 110, such that the end effector 104 can clear the shoulder housing 114 and the shoulder cap 115. In this way, the second arm segment 130 can be fully rotated without the concern of contacting the end effector 104 with the shoulder housing 114 and/or shoulder cap 115 and potentially damaging the end effector 104.

Figure 16:
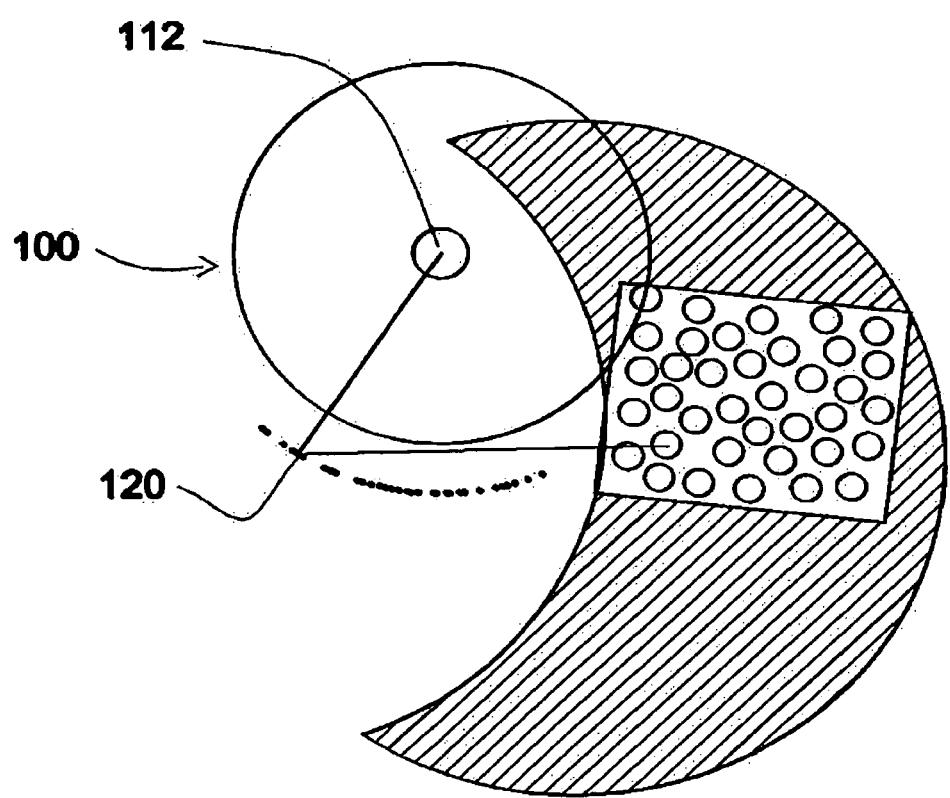
FIG. 16 is a top schematic view of an articulated arm performing a filling operation.

FIG. 16 shows an example pharmaceutical fill application of articulated arm 100 filling containers positioned on a rectangular tray. In an example, the containers need not be packed in a tight array. In an example, the containers can all be filled in tool trajectories requiring repetitive, relatively short rotations of the shoulder shaft 112 in combination with relatively large rotations of the elbow joint 120. In an example, a vision system and a path planning algorithm can be used for tool trajectories that are driven by random positioned objects, such as the containers such shown in FIG. 16.

Although the above examples of the articulated arms 100 and 200 include joints that rotate about vertical axes, such articulated arms can include joints rotatable about axes other than vertical axes or in addition to being rotatable about vertical axes. As such, it is contemplated herein that the joints of the articulated arm examples described herein be rotatable about variously oriented axes, depending upon various factors, including, but not limited to desired movement of the articulated arm, working space size and/or configuration, task or process to be performed, etc.

The articulated arms 100 and 200 and systems described herein can be used for manufacturing processes in isolator systems in use in applications, such as pharmacy automation, biotechnology process automation, manufacturing of food and pharmaceutical products, assembly and packaging of diagnostic tests and medical devices, and the like. In an example, the systems can be used in the handling and manipulating of sterile pharmaceutical containers, closures, seals, and other materials for product manufacturing systems, such as aseptic filling and processing systems.

The articulated arms 100 and 200 and/or systems described herein provide for cleanable and decontaminatable static seals for use in food and pharmaceutical systems. In another example, the articulated arms 100 and 200 and/or systems described herein provide for cleanable and decontaminatable rotating seals for use in food and pharmaceutical systems. In another example, the articulated arms 100 and 200 and/or systems described herein provide for relatively highly cleanable articulated systems and articulated arms. These articulated arms 100 and 200 enable multi-axis manipulation of products, parts, and/or packaging in food and/or pharmaceutical facilities. The articulated arms 100 and 200 and/or systems described herein can be a fully sealed 3-axis robot to enable multi-axis manipulation of products, parts, and/or packaging in contamination critical environments, such as, for instance, food and pharmaceutical manufacturing facilities. The articulated arms 100 and 200 allow for automated manufacturing and test processes and can lessen, if not eliminate, the need for human manipulation in the processed. Any or all components of the articulated arms 100 and 200 and/or systems described herein can be cleaned by solvents, aqueous solutions of acids, bases, detergents, and the like and/or can be decontaminated by chemical means, such as, for instance, by hydrogen peroxide vapor exposure.

The articulated arms 100 and 200 and/or systems described herein provide for externally disposed components having a decreased number of crevices and cavities and or a decreased number of protrusions. Such components, in various examples, allow for increased cleaning of the components; increased decontamination of the components, for instance, using chemical decontamination, such as, for instance, using vaporous hydrogen peroxide. Such components, in some examples, allow for increased visual inspection. Such components, in some examples, allow for increased inspection by aided methods, such as, for instance, riboflavin residue testing.

In some embodiments, the articulated arms 100 and 200 and/or systems described herein provide sealed stainless steel articulated arms for use in isolator systems. In some embodiments components of the articulated arm include relatively few or no sharp corners and relatively few or no unsealed metal-to-metal joints and are of seamless single shell design.

In some embodiments, the rotating joints and static joints are sealed and designed in such a way that few to no crevices exist in the sealed joints. In an example, most, if not all, surfaces of the articulated arms 100 and 200 are self-draining and relatively easily accessible for cleaning, inspection, decontamination, and the like.

The drive systems for driving and controlling the linear motion shaft, the plurality of arm segments, and the end effector can be fully enclosed within the articulated arm apparatus to prevent any debris or contamination associated with such drive systems from entering the working space of the isolator chamber.

The present inventors believe that the articulated arms 100 and 200 and/or systems described herein are advantageous for many reasons, including at least the following reasons. For instance, the articulated arms 100 and 200 and/or systems described herein can reduce the risk of operator exposure when handling potent compounds and/or cytotoxic materials. The articulated arms 100 and 200 and/or systems described herein can lessen the likelihood of cross contamination when using non-dedicated equipment. Also, it is believed that the articulated arms 100 and 200 and/or systems described herein provide for increased repeatability of processes for cleaning and/or decontamination of components. Additionally, it is believed that the seals and other components of the articulated arms 100 and 200 and/or systems described herein allow for cleaning by an automated process and/or decontamination, for instance, using chemical decontamination using hydrogen peroxide vapor or the like.

Further, the articulated arms 100 and 200 and/or systems described herein can provide for locating an end effector at a relatively high speed. It is also believed that the construction of the components of the articulated arms 100 and 200 and/or systems described herein allows for decreased weight and, in turn, inertial characteristics of the components. For at least this reason, the present inventors believe that the articulated arms 100 and 200 and/or systems described herein can be advantageously used in systems requiring relatively frequent high speed travel and relatively frequent directional changes. Also, the articulated arms 100 and 200 and/or systems described herein can be scaled to any desired reach and/or load-carrying capacity.

The articulated arm 100 or 200 can be employed in a filling system configured to fill containers with a product. The product can be a liquid product, a pharmaceutical product or a potentially toxic or otherwise harmful product. The filling system can be configured to locate, target, and fill containers within a tray or nest. Many types of containers are contemplated herein, including, but not limited to vials, syringes, bottles, beakers, test tubes, etc. The filling system includes a chamber configured to maintain desired environmental conditions. The chamber can be an isolator chamber capable of maintaining an aseptic environment within the chamber.

The filling system allows for robotic filling of containers. In an example, the system allows for the aseptic filling of vials and syringes, particularly for small and developmental runs of potent and/or toxic materials. The system can provide an automated aseptic filling system that does not require the use of unique or specialized components for various container sizes. The system allows for filling of various sized or shaped containers, provided a recognizable container opening exists. Also, the filling system can include an optical system to allow for inspection of containers prior to filling, thus reducing the possibility of rejection due to container defects post-filling. Additionally, pre-fill inspection can be achieved with an optical sensor without the use of additional parts or manual steps. In one example, the systems are configured to be minimally disruptive to sterilized airflows commonly used in aseptic filling.

In this way, randomly placed containers can be filled automatically, potentially resulting in labor and time savings. The optical sensor system allows for precision targeting and filling of containers, which can lead to reduced potential for spills of high-value or toxic materials that could require containment. Because the filling system is capable of handling various products and variously sized and shaped containers, the filling system is relatively rapidly adaptable for new products and processes. Also, by using optical sensors in some examples, the system allows for reduction of product losses due to inclusion of a pre-fill inspection of containers. Additionally, because the system is relatively small and contained it provides for relatively easy cleaning of surfaces and parts. Moreover, by being configured to accept variously sized and shaped containers, the system allows for reduced cost because little or no container-specific parts are needed.

In one embodiment, the hermetic sealing provided by the articulated arm is sufficient to satisfy predetermined requirements according to ISO standard ISO10648-2, entitled "Containment Enclosures Part 2—Classification According to Leak Tightness and Associated Checking Methods." In another embodiment, the hermetic sealing provided by the articulated arm is sufficient to satisfy predetermined requirements according to PDA Journal of Pharmaceutical Science and Technology Technical Report no 34, entitled "Design And Validation of Isolator Systems for the Manufacturing and Testing of Health Care Products" (September/October 2001). Both of these documents are herein incorporated by reference.

Notes

The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. As used in this disclosure, except where the context requires otherwise, the term "comprise" and variations of the term, such as "comprising," "comprises" and "comprised" are not intended to exclude other additives, components, integers or steps.

In the foregoing specification, the invention has been described with reference to specific embodiments thereof. It will, however, be evident that various modifications and changes may be made thereto without departing from the broader spirit and scope of the invention. The specification and drawing are, accordingly, to be regarded in an illustrative rather than a restrictive sense. It should be appreciated that the present invention should not be construed as limited by such embodiments.

From the foregoing description it will be apparent that the present invention has a number of advantages, some of which have been described herein, and others of which are inherent in the embodiments of the invention described or claimed herein. Also, it will be understood that modifications can be made to the device, apparatus and method described herein without departing from the teachings of subject matter described herein. As such, the invention is not to be limited to the described embodiments except as required by the appended claims.

PARTS LIST 100 articulated arm apparatus
102 base
103 flange
104 fill needle
110 first arm segment
112 shoulder shaft
114 shoulder housing
114' shoulder housing
115 shoulder cap
116 first arm segment housing
116A upper surface
116' arm segment housing
118 elbow housing
118' elbow housing
119 fasteners
120 elbow joint
121 spindle
122 end effector
123 bearings
124 bellows
126 rotatable hub
129 pulley
130 second arm segment
131 elbow cap
132 elbow housing
133 channel
135 opening
200 articulated arm apparatus
204 end effectors
222 second arm segment housing
230 second arm segment
234 end housing
240 end joint
241 end cap
242 end effector
300 radial seal
302 fingers
310 static seal

What is claimed is:

1. A method of manipulating pharmaceutical products in a sealable isolator chamber, comprising:
   rotating a shaft that passes through an opening in the sealable isolator chamber,
   moving a plurality of interconnected arm segments that are operatively connected to the shaft to manipulate the pharmaceutical products,
   sealing a space within the interconnected arm segments,
   sealing a portion of the shaft inside the chamber, the sealing including circumferentially deploying a radial seal member that extends radially outwards from the opening to prevent contamination, wherein the radial seal member is an exposed cleanable radial lip seal comprising a at least three circumferentially sealing parts, and
   translating the shaft in a series of opposing strokes while the step of sealing a portion of the shaft maintains a hermetic seal during the steps of translating, sealing which is performed by an element that expands and contracts during the steps of translating.

2. The method of claim 1, wherein the step of sealing a space within the interconnected arm segments includes sealing at least one of the interconnected arm segments by a single seamless shell.

3. The method of claim 2, wherein each of the interconnected arm segments comprise a single seamless shell.

4. The method of claim 1, wherein the step of sealing a space within the interconnected arm segments seals a drive mechanism for moving the arm segments inside the arm segments.

5. The method of claim 1, further comprising the step of translating the shaft axially though the opening.

6. The method of claim 1, further comprising attaching an end effector to a terminal arm segment.

7. The method of claim 6, wherein the end effector is configured to dispense a pharmaceutical product.

8. The method of claim 6, wherein the end effector is configured to support a tray.

9. The method of claim 6, wherein the end effector is configured to manipulate a container closure.

10. The method of claim 1, wherein the shaft drives the interconnected arm segments by a pulley system.

11. The method of claim 10, wherein the shaft rotates around a vertical axis.

12. The method of claim 11, wherein at least one of the interconnected arm segments includes a hub that is operably coupled to the shaft and rotates around a vertical axis.

13. The method of claim 1, further comprising, after the step of sealing a further step of decontaminating the sealable isolation chamber.

14. The method of claim 1, further comprising deploying at least one pulley within one of the arm segments to effect the steps of translating.

15. The method of claim 1, wherein the step of sealing a space within the interconnected arm segments includes using at least one hermetically sealed rotary elbow joint, the rotary elbow joint comprising a rotatable hub, an elbow housing, and a radial seal member for hermetically sealing the hub to the elbow housing.

16. The method of claim 15, wherein the step of moving the plurality of interconnected arm segments includes operating a motor operably coupled to the hub.

17. The method of claim 1, further comprising the step of moving the shaft axially with respect to the opening.

18. The method of claim 17, wherein the step of sealing a portion of the shaft is performed by an element that expands and contracts during the axially moving.

19. The method of claim 1, wherein the step of moving includes automatically controlling the interconnected arm segments.

* * * * *